Oct. 3, 1933.                L. H. McCLINTOCK                1,929,366
                              DECORATIVE ARTICLE
                              Filed Feb. 7, 1933
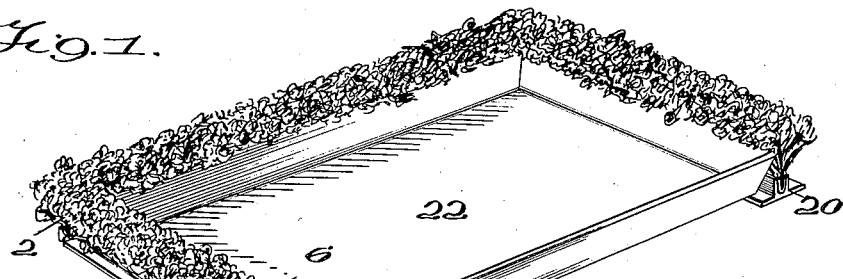
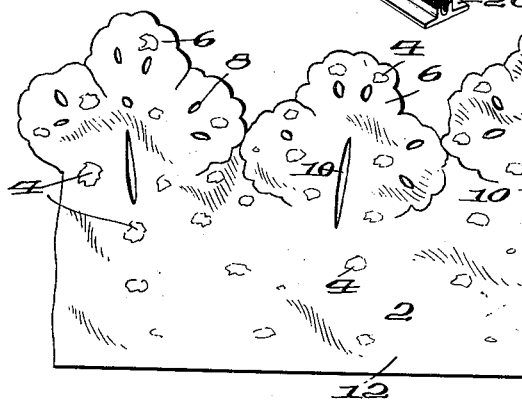
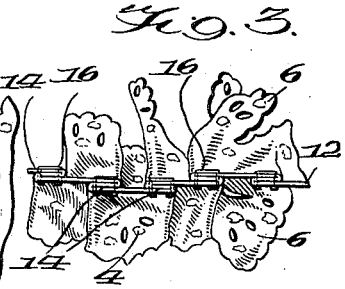
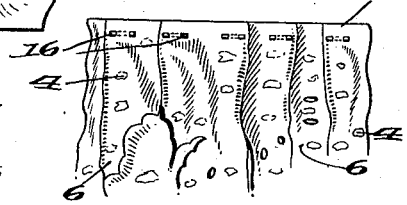
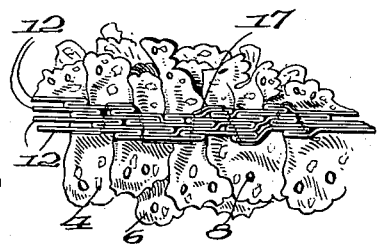
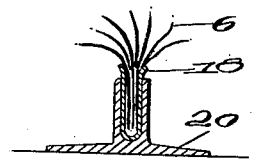
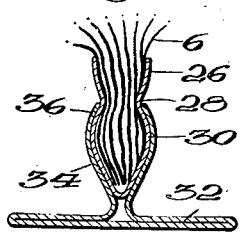
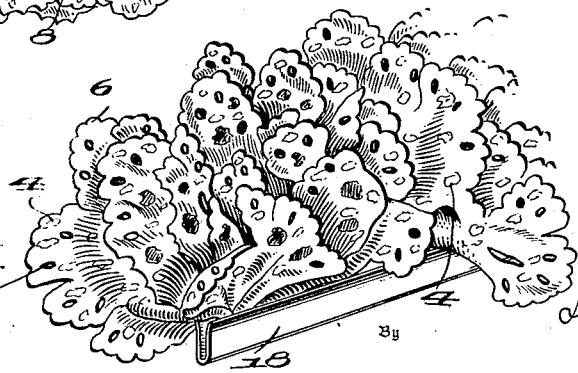
Inventor
Lynn H. McClintock
By
Fisher Pedersen, Attorneys Patented Oct. 3, 1933

1,929,366

UNITED STATES PATENT OFFICE 1,929,366

DECORATIVE ARTICLE

Lynn H. McClintock, Los Angeles, Calif.

Application February 7, 1933. Serial No. 655,641

13 Claims. (Cl. 41—13)

This invention is a decorative article for simulating such greens as parsley, spinach, carrot tops, kale, lettuce, etc., often used in groceries, meat markets and fruit stores for the decoration of the stands and windows.

At the present time, the grocer or meat market proprietor usually uses real parsley, spinach, etc., for such decorative work, but the greens which are so used deteriorate and dry up, and may have to be thrown away. Also, such greens have to be painstakingly placed piece by piece on the stand, and with little to hold them in place, are liable to become disarranged.

The artificial decorative greens of this invention have an indefinite life and may be used over and over again and so the storekeeper is not subjected to any loss by drying up or deterioration, etc., as is the case if he uses real greens for decoration. Furthermore, the decorative greens of this invention are held in more or less rigid holders of various sizes and shapes so that they may be placed exactly as desired on the stand, and will stay there. While the main use of the greens of this invention is in making decorative borders around display trays and around display stands, and in making dividing lines between different meats, groceries, etc., on display, the articles can also be used, inasmuch as they are made up in straight and curved shapes, for forming letters, prices, etc., as will readily be apparent. With a number of straight units of one or two sizes and a number of curved units, about the shape of a semi-circle made perhaps in two sizes, it will be evident that almost any letter or numeral can be formed.

Coming now to the more specific aspects of the invention, the decorative article of this invention is preferably made of green sheet rubber, although any other suitable material could be used. The sheet rubber is preferably provided with shiny spots on either or both sides, which spots will glisten more or less when in use, giving the appearance of freshly sprinkled greens.

The article is made by taking an elongated strip of green rubber, as above described, and cutting one edge in a decorative pattern, for approximately simulating leaves of parsley, lettuce, etc. The opposite longitudinal edge is gathered into folds all along the edge and the folds held in place by stapling or the like. This gathering of the lower edge gives a bunched effect, although in the finished article, a better massed or bunched effect is obtained by taking a plurality of sheets with gathered lower edges and placing them side by side and clamping them in a suitable holder.

The holder is preferably of light sheet metal, and may be curved or straight and of various sizes, as indicated above. This holder may be used in conjunction with a base member so that it will stand up wherever placed.

The general features of the invention having been thus outlined, the invention will be more specifically described by reference to the accompanying drawing.

The accompanying drawing illustrates the present preferred embodiment of the invention, although it should be understood that the invention is not to be limited to the precise details and uses here disclosed.

In the drawing, Fig. 1 is a perspective view of the decorative article in use;

Fig. 2 is a view of a part of a sheet of rubber or the like before one edge is gathered;

Fig. 3 is a bottom view showing one edge of the sheet gathered or folded;

Fig. 4 is a side view of Fig. 3;

Fig. 5 shows four of the sheets with gathered edges in assembled relation;

Fig. 6 shows the bunched sheets clamped in a holder;

Fig. 7 shows the holder in position in a base member; and

Fig. 8 shows another type of base member.

Referring now to the drawing, in which similar reference characters indicate similar parts, 2 shows a sheet of relatively thin material, preferably green and preferably made of thin sheet rubber. One or both surfaces of the sheet rubber could be dull or shiny, but in the preferred embodiment of the invention one surface of the rubber, such as the back surface, may be of a rather dull finish, while the other surface, that shown in Fig. 2, is, for the most part, of a relatively dull finish, but is provided with bright or shiny spots or areas 4. In the finished article these bright or shiny spots will glisten and resemble drops of water and give a fresh looking effect to the grocer's display.

The shiny spots 4 may be made in any desired manner, such for example, as the following: thin sheet rubber after having been rolled by machinery, is rerolled by hand on a sheet of paper, so that air is trapped between the rubber and the paper. When the rubber cures, in contact with the paper, the spots where the air has been trapped will be bright or shiny, while the rest of the sheet will be dull.

The sheet 2, at the start, is relatively long and narrow, and one edge, such as the upper edge, is cut as indicated to approximately simulate leaves of parsley, kale, lettuce, spinach, etc. These leaves are shown at 6. Holes 8 and slots 10 add to the decorative effect.

The lower edge 12 of the sheet is gathered into folds indicated generally at 14 and these folds are held in folded position by fastening devices 16, such as staples or by a thread put in with an ordinary needle, or by cement.

To give a better massed or bunched effect, a plurality of the strips with gathered lower edges are placed side by side and all secured together. Referring to Fig. 5, four of the sheets with gathered lower edges, as shown in Fig. 3, are assembled in side by side relation with all of their lower edges 12 substantially coincident, and are then sewed, basted, cemented or otherwise fastened together by some suitable fastening, such as the thread 17, which can be readily passed back and forth through the gathered edges as indicated.

In order to hold the plurality of assembled sheets in position, and to provide a rigid unit, the gathered edges thereof are inserted in a clamping holder 18, which is preferably of light sheet metal having some rigidity. After the insertion of the gathered edges in the holder, the sides of the holder may be squeezed together for exerting a clamping pressure so as to give the finished article substantially the appearance as shown in Fig. 6.

In order to make the unit self-sustaining, the U-shaped holder 18 may be inserted into a base member 20 provided with a U-shaped groove for receiving the holder 18. The holder 18 could have a supporting base attached or integral with it, if desired.

The holders 18 and the base members 20 may be made up in convenient lengths, some a foot long, some a foot and a half and some two feet long, for example, so that they may be used for building up a decorative border around the display tray 22, as shown in Fig. 1.

Fig. 8 shows a slight modification of the holder and base member. In this view the stiffening holder 26, corresponding to 18 of Fig. 6, is somewhat constricted at 28 and engages over the gathered edges of the sheets just above the stapling devices, the holder being enlarged as at 30 for giving clearance for the staples or the like.

The base member 32, which is preferably of light sheet metal, is provided with outwardly and inwardly extending portions 34 and 36 which engage over the bulge 30 in the holder 26, the portion 36 extending in toward the constriction 28. It will be apparent that the holder 26 can be slipped into the base member by pushing it in from above, arms 34 springing apart for the purpose, or it might be inserted from the end by sliding it in. The holder 26 and the base member 32 could be made as one article, if desired, by making them integral or by securing them together.

In order to give a more fluffy appearance to the article, a leaf or series of leaves, of the same or slightly different design as the leaves shown in Figs. 2 and 6, may be used, and assembled with the other leaves so as to extend more toward the horizontal, thus increasing the effective width of the article.

The holders 18 or 30, and their corresponding base members, may be straight, as shown, or may be curved, as into more or less of a semi-circle. It will be evident that with curved and straight holders of suitable sizes, there is provided a plurality of units from which letters, prices, etc., may be built up. For example, the grocer might, using the straight and curved strips of this invention, outline on a flat base the price per dozen of oranges, for example, and then fill in around the strips with oranges, the oranges concealing the holders and base members and providing an effective background. The resulting display is effective, ornamental and quickly set up. It is evident that the articles may be used again and again in other displays.

While the present preferred embodiments of the invention have been described in some detail, it should be understood that the invention is not to be limited to such structural details, nor is the invention limited to the uses described.

I claim as my invention:

1. A decorative article for simulating vegetation, comprising a sheet of material, one longitudinal edge of the sheet being made to simulate natural leaves, flowers, etc., while the other longitudinal edge is gathered for giving a bunched effect, in combination with a holder for embracing and clamping the leaves along said gathered edge.

2. A decorative article for simulating vegetation, comprising a sheet of green material, one longitudinal edge of which is made to simulate natural leaves, flowers, etc., while the other longitudinal edge is gathered for giving a bunched effect, securing means for holding the folds of the gathered edge in place, and longitudinally extending substantially U-shaped clamping means for clamping the gathered edge and for giving rigidity to the finished article.

3. A decorative article for simulating vegetation, comprising a sheet of green material, one longitudinal edge of which is made to simulate natural leaves, flowers, etc., while the other longitudinal edge is gathered for giving a bunched effect, securing means passing through the folds of the gathered edge, for holding such folds in position, and longitudinally extending clamping means for embracing and clamping the gathered edge, and for giving rigidity to the finished article.

4. A decorative article for simulating vegetation, comprising a sheet of green rubber or the like, one longitudinal edge of which is made to simulate leaves, flowers, etc., while the other longitudinal edge is gathered closely into folds for giving a bunched effect, and a substantially U-shaped clamping device which is adapted to hold a plurality of said bunched articles in assembled position with their gathered edges side by side, said clamping device giving rigidity to the finished article.

5. A decorative article for simulating vegetation, comprising a sheet of green rubber or the like, one longitudinal edge of which is made to simulate leaves, flowers, etc., while the other longitudinal edge is gathered closely into folds for giving a bunched effect, securing means for holding the folds of the gathered edge in place, and a substantially U-shaped clamping device which is adapted to hold a plurality of said bunched articles in assembled position with their gathered edges side by side, said clamping device giving rigidity to the finished article.

6. A decorative article for simulating vegetation, comprising a plurality of leaves, made to simulate natural leaves, made of green rubber or the like, snugly gathered together and provided with dull and bright areas, in combination with a substantially U-shaped holder for clamping the leaves and holding them in assembled position.

7. A decorative article for simulating vegetation, comprising a sheet of material, provided with dull and shiny areas, the latter simulating drops of water, one longitudinal edge of the sheet being made to simulate natural leaves, flowers, etc., while the other longitudinal edge is gathered for giving a bunched effect, in combination with a holder for embracing, compressing and clamping the leaves along said gathered edge.

8. A decorative article for simulating vegetation, comprising a sheet of green material, one longitudinal edge of which is made to simulate natural leaves, flowers, etc., while the other longitudinal edge is gathered for giving a bunched effect, the surface of the sheet being provided with dull and bright areas, securing means for holding the folds of the gathered edge in place, and longitudinally extending substantially U-shaped clamping means for clamping the gathered edge and for giving rigidity to the finished article.

9. A decorative article for simulating vegetation, comprising a sheet of green rubber or the like, one longitudinal edge of which is made to simulate leaves, flowers, etc., while the other longitudinal edge is gathered closely into folds for giving a bunched effect, the surface of the sheet being provided with dull and bright areas, and a clamping device which is adapted to embrace and compress a plurality of said bunched articles in assembled position with their gathered edges side by side, said clamping device giving rigidity to the finished article.

10. A decorative article for simulating vegetation, comprising a plurality of leaves, made of green material, closely gathered together, a substantially U-shaped holder for clamping the leaves and holding them firmly in assembled position, and a base member for engagement with said holder.

11. A decorative article for simulating vegetation, comprising a sheet of material, one longitudinal edge of the sheet being made to simulate natural leaves, flowers, etc., while the other longitudinal edge is gathered for giving a bunched effect, in combination with a substantially U-shaped holder for clamping the leaves along said gathered edge, and a base member for engagement with said holder.

12. A decorative article for simulating vegetation, comprising a sheet of green material, one longitudinal edge of which is made to simulate natural leaves, flowers, etc., while the other longitudinal edge is gathered for giving a bunched effect, securing means for holding the folds of the gathered edge in place, longitudinally extending substantially U-shaped clamping means for clamping the gathered edge and for giving rigidity to the finished article, and a base member for detachable engagement with said clamping means.

13. A decorative article for simulating vegetation, comprising a sheet of green rubber or the like, on longitudinal edge of which is made to simulate leaves, flowers, etc., while the other longitudinal edge is gathered closely into folds for giving a bunched effect, a substantially U-shaped clamping device which is adapted to hold a plurality of said bunched articles in assembled position with their gathered edges side by side, said clamping device giving rigidity to the finished article, and a base member for detachable engagement with said clamping device.

LYNN H. McCLINTOCK.